United States Patent [19]

Benko et al.

[11] Patent Number: 4,699,119

[45] Date of Patent: Oct. 13, 1987

[54] HEATER CABINET

[76] Inventors: John C. Benko, 6226 Oakwood Cir., North Ridgeville, Ohio 44256; Glen H. Blythe, 4921 Corduroy Rd., Mentor, Ohio 44060

[21] Appl. No.: 912,302

[22] Filed: Sep. 29, 1986

[51] Int. Cl.$^4$ .............................................. A21B 1/08
[52] U.S. Cl. ..................................... 126/20; 34/233; 34/220; 34/236; 126/19 R
[58] Field of Search ............ 126/20, 21 R, 369, 19 R, 126/304 R, 19 M, 305; 34/220, 221, 201, 225, 233, 236, 238.78, 239, 179, 237

[56] References Cited

U.S. PATENT DOCUMENTS

| | | | |
|---|---|---|---|
| 1,233,000 | 7/1917 | Trescott | 126/369 |
| 1,403,016 | 1/1922 | Drake | 34/234 |
| 1,609,888 | 12/1926 | Secord | 34/233 |
| 1,652,830 | 12/1927 | Moore | 34/220 |
| 2,260,710 | 10/1941 | Gschwind | 126/369 |
| 3,367,043 | 2/1968 | Torigian | 34/238 |
| 4,136,465 | 1/1979 | Wilson | 34/236 |

*Primary Examiner*—James C. Yeung
*Attorney, Agent, or Firm*—Renner, Otto, Boisselle & Lyon

[57] ABSTRACT

A heater cabinet which utilizes a source of steam heat to elevate to a predetermined working temperature various industrial containers and the contents thereof. Containers suitable for use with the heater cabinet include barrels, drums, pails, nondisposable and disposable liquibins, and the like. In a preferred embodiment the cabinet includes a plurality of insulated walls which define an enclosure. Access to the enclosure is provided by a pair of swinging doors hinged to the front wall of the cabinet. Mounted near the bottom of the enclosure is an open grate for supporting containers placed within the enclosure for heating. Beneath the grate and contiguous therewith is a steam coil for connection to a source of steam which imparts heat into the enclosure. Below the steam coil is a drip pan for collecting and containing any spillage or drippage which may inadvertently flow from the container. The drip pan is provided with a drain outlet which opens through the bottom wall outside the cabinet and serves to drain the contents of the pan and release any pressure that may form within the enclosure.

6 Claims, 6 Drawing Figures

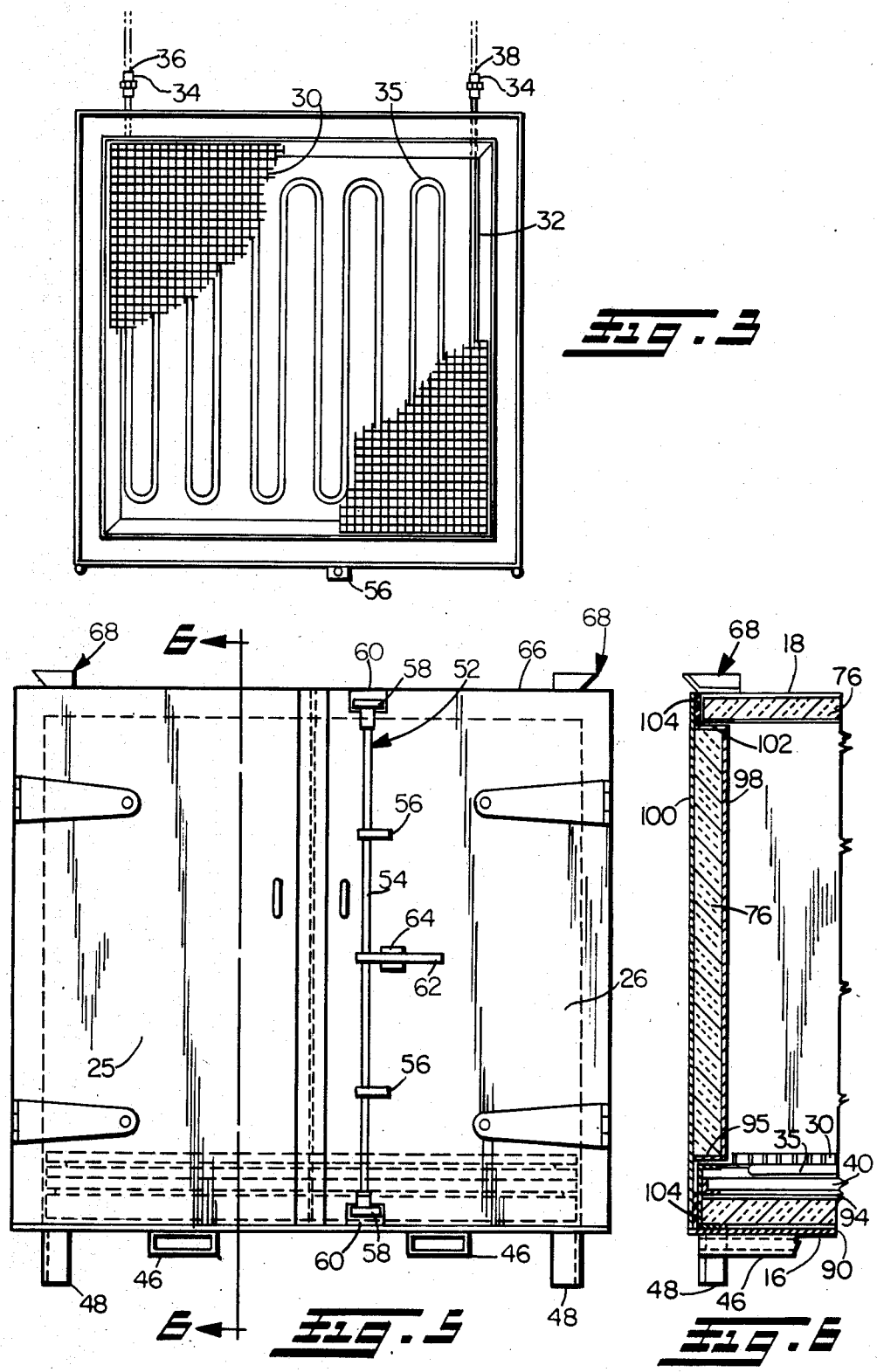

HEATER CABINET

This invention relates to a heater cabinet. More particularly, this invention relates to a heater cabinet which employs a source of steam heat for elevating to a predetermined working temperature industrial containers and their contents.

BACKGROUND

Various industrial chemicals and compounds cannot be properly utilized unless they are warmed to a specific temperature. For example, in cold weather some greases will harden to such an extent that their application and use is rendered impossible. In order to render such greases usable, the grease must be heated to a predetermined working temperature. The viscosity, flowability or workability of many liquids, semi-liquids or even non-liquid materials depends upon the temperature of such material.

The prior art provides various devices for heating the contents of industrial containers. Such devices include electrical resistance and steam heating coils which may be placed within or around the outside of the containers.

Unfortunately, such prior art devices many times fail to provide an even distribution of heat to the container and its contents resulting in the formation of "hot spots". Also, such prior art devices, which require the insertion of the device into the container, can create quite a mess during the insertion, removal, and subsequent cleaning of the device. Furthermore, with respect to electrical devices, the fire hazard presented by such devices can be unacceptable when heating containers filled with volatile substances. Also, many such heaters are too large to efficiently heat one or a few containers at a time. Also, such large heaters tend to be fixed or stationary, requiring the transportation of the heated container over a substantial distance to the point of use.

The present invention provides a cabinet for heating industrial containers and the contents thereof which overcomes many of the disadvantages and drawbacks associated with the prior art devices.

SUMMARY OF THE INVENTION

The present invention provides a cabinet for heating to a predetermined working temperature barrels, drums, disposable and nondisposable liquibins, pails, and various other containers having industrial chemicals therein. The heater preferably utilizes steam as a source of heat.

In a preferred embodiment, a heater cabinet made in accordance with the present invention comprises a plurality of interconnecting insulated walls which form an enclosure. One of the walls comprises a pair of hinged doors which open to provide access to the enclosure. Like the walls, the doors are also fully insulated to minimize the dissipation of heat from the enclosure. Elevated just above the bottom wall of the cabinet is an open grate upon which the containers to be heated are placed. Immediately beneath and contiguous with the grate is mounted a steam coil. By mounting the coil contiguous with the grate, the grate serves to ensure the even distribution and flow of heat within the enclosure and to the container and its contents. The grate then serves also the same purpose as the fins in a fin tube heat exchanger. Mounted beneath the steam coil is a drip pan which serves to collect and contain spillage or drippage emanating from the containers. Preferably, the drip pan includes a drain outlet which extends through the bottom wall and serves to drain the pan, and also provide an outlet for pressure that may form in the enclosure.

Mounted upon the outside surface of the bottom wall of the cabinet are a pair of hollow rails or channels which are adapted to receive the tongs of a conventional forklift truck. Such channels help to facilitate the safe movement and stacking of the cabinet. The outside surface of the bottom wall further includes a plurality of legs which serve to elevate the cabinet above the surface upon which it is sitting so as to minimize heat loss through the bottom wall and provide easier access for a lift truck to the channels.

In order to hold the doors securely closed, the cabinet includes a closure mechanism like that commonly used on the rear doors of conventional truck trailers. Mounted on the outside surface of the top wall of the cabinet are a plurality of nesting plugs which assist a lift truck operator in properly stacking the cabinets one upon the other.

By employing a heater cabinet made in accordance with the present invention, a user does not have to remove the contents of the container or insert anything into the container to effectuate heating. Furthermore, the cabinet, because it employs steam as a heat source, does not expose the container and its contents to a source of ignition such as a flame or an electric resistance heating coil. Also, because the cabinet provides an even flow and distribution of heat within the enclosure, "hot spots", commonly experienced with prior art devices, are minimized or eliminated.

To the accomplishment of the foregoing and related ends, the invention, then, comprises the features hereinafter more fully described and more particularly pointed out in the claims, the following description and the annexed drawings setting forth in detail certain illustrated embodiments of the invention, these being indicative, however, of but a few of the various ways in which the principles of the invention may be employed.

BRIEF DESCRIPTION OF THE DRAWINGS

FIG. 3 is a cross-sectional view of the heater cabinet of FIG. 2 taken on line 3—3 thereof with the grate partially broken away;

FIG. 5 is a front elevational view of the heater cabinet of FIG. 1 with the doors mounted thereon; and FIG. 6 is a broken cross-sectional view of the heater cabinet of FIG. 5 taken on lines 6—6 thereof.

DETAILED DESCRIPTION OF THE PREFERRED EMBODIMENT

Figure 1:
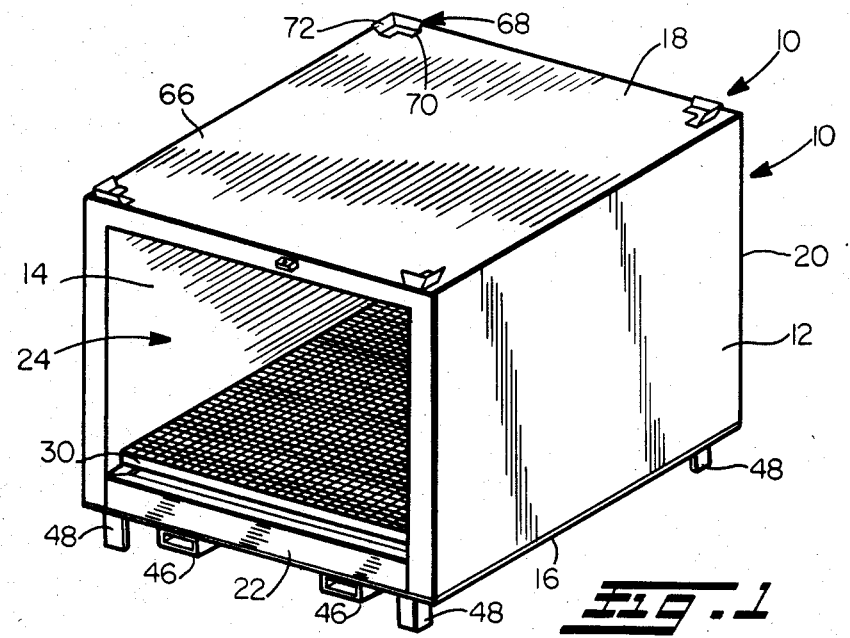
FIG. 1 is an isometric view of a heater cabinet made in accordance with the present invention wherein the doors and hinges have been removed.
Figure 2:
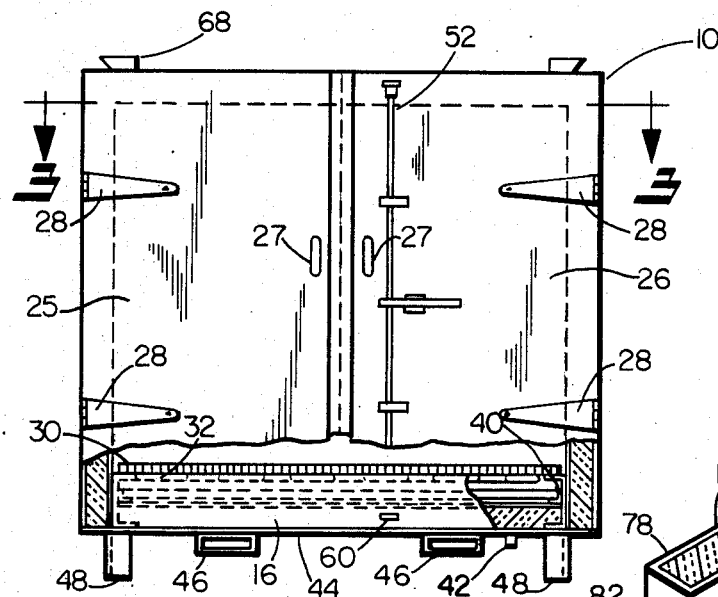
FIG. 2 is a partially broken away front elevational view of the heater cabinet of FIG. 1 having the doors mounted thereon.

Referring to the drawings, and initially to FIGS. 1–3, there is illustrated a heater cabinet 10 made in accordance with the present invention. Cabinet 10 may be utilized to heat drums, barrels, nondisposable and disposable liquibins, pails, and other like containers and the contents thereof to a desired working temperature. Cabinet 10 allows the combined heating of a container and its contents and does not require the emptying of such contents into a separate tank or container for heating. Cabinet 10 further provides for the heating of the container and its contents without the insertion of a heating device into the container, and without exposing the container and its contents to a flame, an electric heating coil, or other like source of ignition.

The cabinet 10 includes a pair of side walls 12 and 14, a bottom wall 16, a top wall 18, a back wall 20, and a rectangular open front wall 22, all of which cooperate to form an enclosure 24. The front wall 22 is closed by a pair of swinging doors 25 and 26 with handles 27, which provide access or entry into the enclosure 24, and which are attached by strap hinges 28.

Although as illustrated, front wall 22 is essentially formed from the front ends or edges of side walls 12 and 14, and top and bottom walls 18 and 16, respectively, it will be appreciated that front wall 22 may be of much greater dimensions and may be separately formed from the other walls. However, by forming front walls 22 as shown, maximum access is provided to the enclosure 24 when doors 25 and 26 are opened. Furthermore, although a pair of doors 25 and 26 are illustrated, the present invention contemplates the use of any number of doors that open in any one of a variety of manners. However, it will be appreciated that by providing two doors, instead of a single door, the clearance required when opening the doors to provide access to the enclosure 24 is greatly reduced.

Mounted above the bottom wall 16 within the enclosure 24 is an open grate 30. Immediately beneath the grate 30 is mounted a serpentine steam coil 32. Steam coil 32, which extends through openings in back wall 20, is connected to a source of steam (not illustrated) by quick connect couplings 34 and serves as a heat source for the cabinet. Specifically, as the steam enters coil 32 at inlet 36, it travels through the various loops, one of which is designated 35, and the heat contained in the steam is transferred or dissipated from the steam through the tubular walls of the coils and into the enclosure 24. The cooled or spent steam then exits or leaves the coil 32 at outlet 38.

Preferably, as illustrated, coil 32 is mounted immediately adjacent and contiguous with grate 30. By mounting the coil in this manner, the grate 30 serves to help radiate and transfer heat uniformly from the coil 32 to the interior of the heater and to the container and its contents. Also, since grate 30 includes a plurality of openings and is elevated above bottom wall 16, it further serves to provide sufficient air space between the container being heated and the bottom wall 16, thus facilitating an even distribution and flow of heat about the entire surface of such container, including its base.

Located beneath coil 32 and above bottom wall 16 is a drip pan 40. Drip pan 40 serves to collect and contain any materials which may inadvertently spill or leak from the containers being heated in enclosure 24. Preferably, pan 40 includes a drain outlet 42 which opens through the bottom wall 16. Outlet 42 may be provided with suitable open-close and relief valves, and in addition to draining pan 40, may also serve to release any pressure that may form in enclosure 24 during the heating of the container or containers therein.

Mounted upon the bottom surface 44 of bottom wall 16 are a pair of hollow rails or channels 46 which are adapted to receive and engage the tines of a conventional forklift truck. Channels 46 help to facilitate the safe moving and stacking of the cabinet 10. Also mounted on the surface 44 of the bottom wall 16 are a plurality of legs 48 which may be constructed from conventional angle iron as illustrated, pipe, channels, tubes and the like. Legs 48, which elevate the bottom above the surface upon which the cabinet is sitting, serve to minimize the heat lost through bottom wall 44, to, for example, a cold or frozen surface. Legs 48 also serve to provide easy access for a forklift to channels 46 and provide plenty of clearance to allow outlet 42 to drain freely.

Referring now to FIG. 5, the closure mechanism 52 for doors 26 is more completely illustrated. Closure mechanism 52, which is similar to the mechanisms commonly utilized on the rear doors of truck trailers, comprises a vertically extending rod 54 supported for rotation by bearing blocks 56. Each end of the rod 54 is provided with a collar 58 having a hook (not illustrated) protruding therefrom which engages the inner walls of the recesses 60 provided in front wall 22. Centrally connected to rod 54 is an arm 62 which facilitates the rotation of rod 54. Rotating arm 62 to the left as shown in FIG. 5, causes rod 54 to rotate and collar 58 to disengage recesses 60, allowing a user to first open door 26 and then door 25, which door 26 overlaps and holds shut. Alternatively, rotating arm 62 to the right as shown in FIG. 5 causes rod 54 to rotate in the opposite direction, which in turn results in the engagement of collars 58 with the inner walls or recesses 60, securely holding doors 25 and 26 in the closed position. Closure mechanism 52 further includes a releasable latch 64 which releasably holds arm 62 securely in engagement therewith when arm 62 is rotated to the right its full extent ensuring that arm 62 maintains its position and doors 25 and 26 remain closed. Latch 64 also includes a release which allows the user to disengage the arm 62 therefrom to permit the rotation of arm 62 and the opening of doors 25 and 26. It will be appreciated that although the cabinet 10 has been illustrated with a particular type of closure mechanism 52, any number of different types of closure or locking devices may be utilized to produce a cabinet in accordance with the present invention.

Located on the top surface 66 of the top wall 18 are mounted a plurality of nesting plugs 68 which are clearly illustrated in FIG. 1. Each plug 68 comprises an L-shaped base 70 which is mounted upon the top surface 66 and an upstanding substantially L-shaped arm 72 which is angled outwardly from base 70 and top surface 66. Plugs 68 are provided on top surface 66 to facilitate the stacking of multiple cabinets, one on top of the other. As the cabinets are being stacked, preferably with a lift truck, the plugs help to ensure that the cabinets are properly centered on top of one another. Specifically, as one cabinet is initially aligned over another with a lift truck, angled arms 72 provide an enlarged target for the lift truck operator for aligning legs 48. Therefore, after initial alignment of one cabinet over the other, angled arms 72 guide the legs 48 of the top cabinet being stacked into final alignment as such cabinet is being lowered upon the bottom cabinet.

Figure 4:
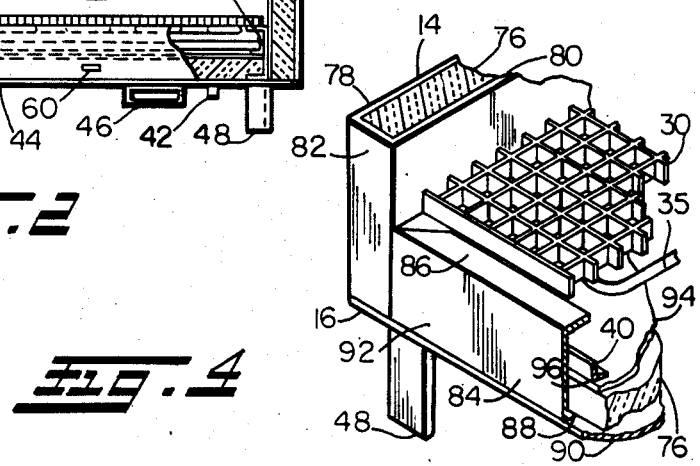
FIG. 4 is a fragmentary cross-sectional view of one corner of the heater cabinet of FIG. 2.

Referring now to FIGS. 4 and 6, the details of the construction of cabinet 10 are more clearly illustrated. Particularly, as shown in FIG. 4, each of the walls, including side wall 14, comprises a layer of insulation material 76 disposed between a pair of metal plates 78 and 80. Outer plate 78 includes a pair of protruding legs 82 formed at each end thereof which abut plate 80 completely enclosing insulation 76. Insulation material 76 may comprise any one of a variety of materials including, for example, fiberglass. Forming part of the front wall 22 of the cabinet 10 is one of a plurality of U-shaped channels 84 which extend along the perimeter of the enclosure 24 at the bottom thereof. The upper legs 86 of channels 84 provide a surface upon which grate 30 is mounted. The lower legs 88 of channel 84 are mounted on the outer plate 90 of bottom wall 16, and the central portion 92 of channel 84 provides a mounting location for the inner or upper plate 94 of bottom wall 16 which in turn supports a plurality of L-shape frame members 96 upon which drip pan 40 is mounted.

Referring now to FIG. 6, the construction of the doors 25 and 26 is more clearly illustrated. Specifically, like the walls of the cabinet 10, doors 25 and 26 each include insulation 76 disposed between an inner plate 98 and an outer plate 100. Inner plate 98 is formed at its ends to include legs 102 which abut, engage and are secured to outer plate 100. Outer plate 100 extends beyond legs 102 so as to provide a closure with the ends of top wall 18 and bottom wall 16. Preferably, as illustrated, the end of top and bottom wall 18 and 16, respectively include a seal 104 which improves the integrity of the closure provided by doors 25 and 26 when they are closed. Seal 104 may comprise a high temperature rubber, composite cork, or the like material.

The cabinet 10 and its various elements may be produced from a variety of materials by various methods known to those skilled in the art. Preferably, however, the steam coil 35 is made of copper to maximize the transfer of heat therefrom and all other components excluding the insulations 76, are preferably fabricated from steel. Steel provides many advantages over other materials in that it is durable, strong, easily fabricated, and relatively inexpensive as compared to other materials.

Although the invention has been shown and described with respect to certain preferred embodiments, it is obvious that equivalent alterations and modifications will occur to others skilled in the art upon the reading and understanding of this specificiation. The present invention includes all such equivalent alterations and modifications, and is limited only by the scope of the following claims.

We claim:

1. A heater cabinet for the heating of containers and the contents thereof comprising an enclosure, a heating coil for heating said enclosure, an open grate mounted adjacent and contiguous with said heating coil which forms an elevated shelf within said enclosure for the placement of such containers and which promotes a uniform dispersion of heat within said enclosure and a more even transfer of heat to such containers located in said enclosure, and a drip pan mounted beneath said open grate which serves to catch and contain any seepage emanating from such containers located in said enclosure, said enclosure including a pair of opposed side walls, a bottom and an opposed top wall, a back wall, and a front wall having mounted thereon at least one door which provides ready access to said enclosure formed by said walls when opened and seals said enclosure shut when closed.

2. A heater cabinet as set forth in claim 1 wherein said drip pan includes a drain outlet for draining the seepage collected therein which extends from the bottom of said drip pan and through said bottom wall providing an outlet for said drain outlet outside said enclosure.

3. A heater cabinet as set forth in claim 1 wherein each of said walls includes a layer of insulation which helps to prevent the dissipation of such heat contained within said enclosure.

4. A heater cabinet as set forth in claim 3 wherein each of said walls comprises a first sheet of metal which forms the outer surface of said wall, a second sheet of metal which forms the inner surface of said wall, said layer of insulation material being disposed between said first and second sheets of metal.

5. A heater cabinet as set forth in claim 1 further including a pair of open channels mounted upon the outside surface of said bottom wall which are adapted to receive tines of a conventional forklift truck to facilitate the movement or stacking of said heater cabinet.

6. A heater cabinet as set forth in claim 1 further including a plurality of legs mounted upon the outside surface of said bottom wall which serve to elevate said bottom wall and channels about the surface or grate upon which the heater cabinet is supported, and a plurality of nesting plugs mounted upon the outer surface of said top wall which upon placement or stacking of a second heater cabinet thereon engage the legs of such second heater cabinet and facilitate the proper alignment of the cabinets.

* * * * *